Oct. 21, 1941.　　　　F. CHANG　　　　2,259,614
CLEARANCE INDICATOR FOR AUTOMOBILES
Filed June 3, 1938　　　2 Sheets-Sheet 1
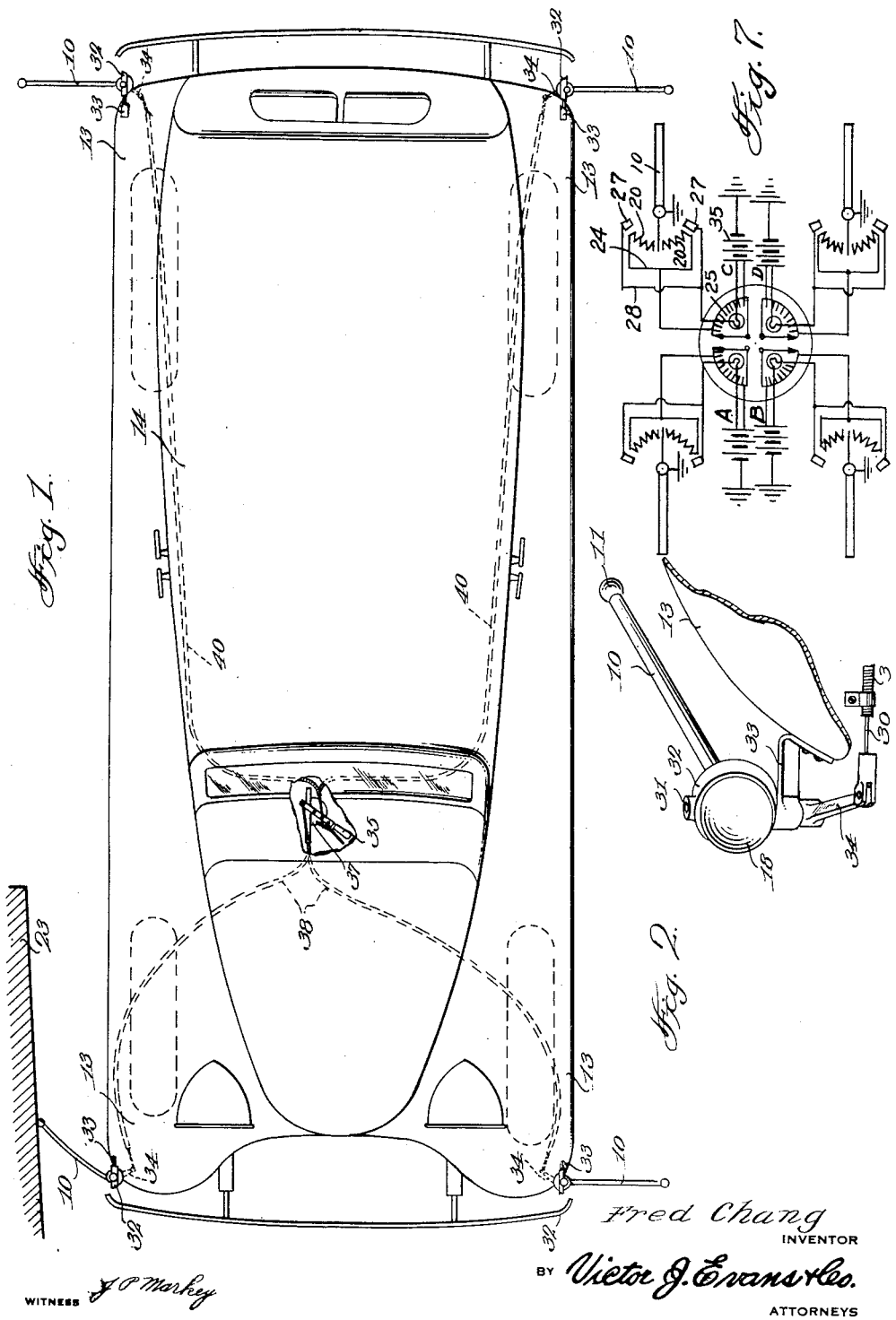
Fred Chang
INVENTOR
BY Victor J. Evans & Co.
ATTORNEYS
WITNESS J. P. Markey

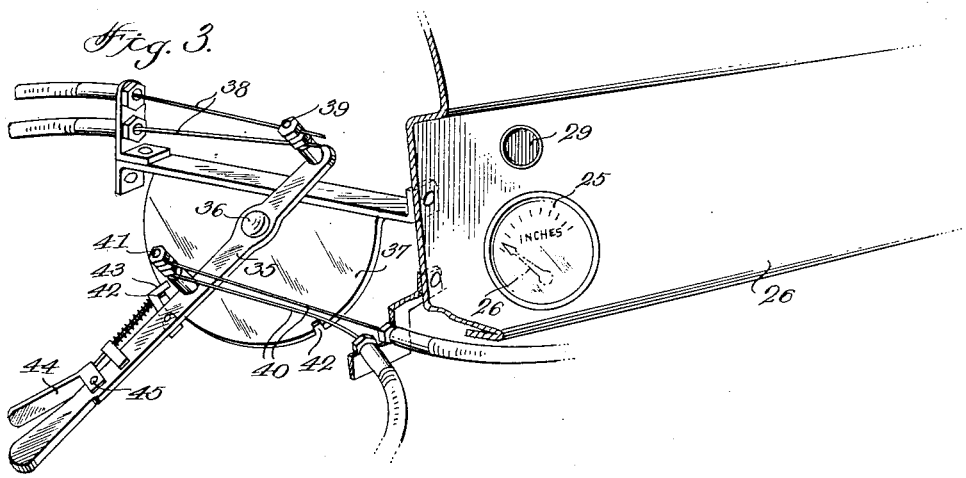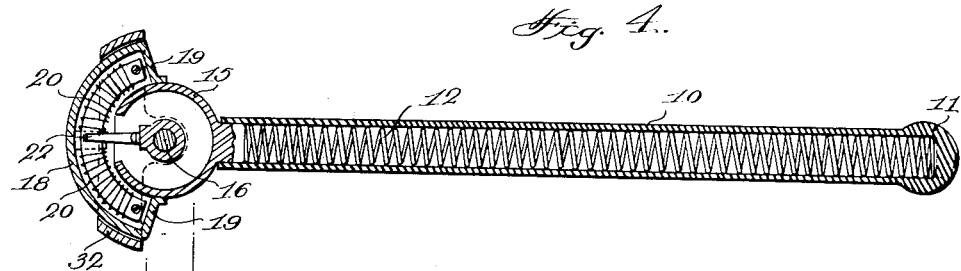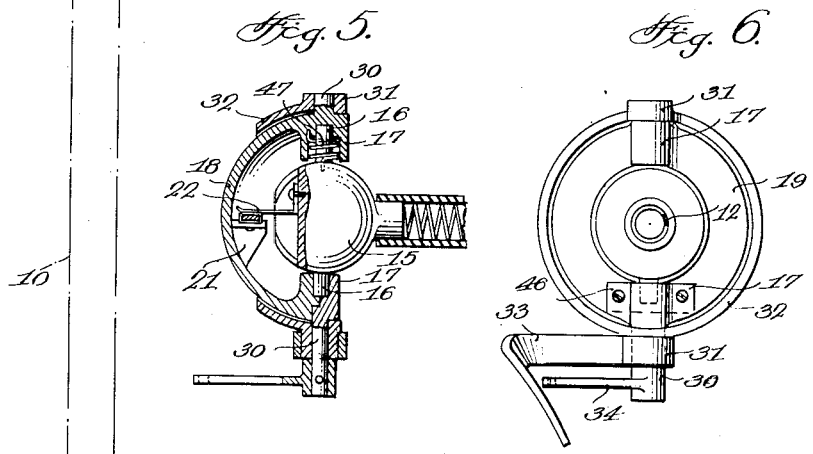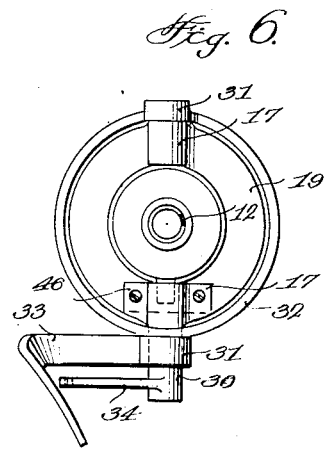

Patented Oct. 21, 1941

2,259,614

UNITED STATES PATENT OFFICE 2,259,614

CLEARANCE INDICATOR FOR AUTOMOBILES

Fred Chang, Oakland, Calif.

Application June 3, 1938, Serial No. 211,665

1 Claim. (Cl. 177—311)

This invention relates to clearance indicators for automobiles and has for an object to provide resilient feeler arms at the front and at the rear of an automobile, adapted to extend at a right angle to the direction of travel of the vehicle and yieldably strike against obstructions such as other cars in parking, narrow garage door openings, and so forth, these arms controlling an electric measuring instrument in plain view of the driver so that the driver by looking at the instrument may know just what clearance he has in which to maneuver his vehicle.

A further object is to provide apparatus of this character which will be formed of a few strong, simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a plan view of an automobile equipped with clearance indicating apparatus constructed in accordance with the invention.

Figure 2 is a detail perspective view showing one of the contact arms in released position.

Figure 3 is a detail perspective view showing the volt meter for measuring clearance and showing the lever and cables for holding the contact arms released until needed.

Figure 4 is a longitudinal sectional view of one of the contact arms.

Figure 5 is a detail vertical sectional view of the resistance coils, housing, and pivotal mounting of one of the arms.

Figure 6 is a front elevation of the parts shown in Figure 5 with parts removed.

Figure 7 is a diagrammatic view showing the electrical connections of the feeler arms of the device.

Referring now to the drawings in which like characters of reference designate similar parts in the various views, 10 designates a tubular rubber feeler arm which is closed at the outer end through the medium of a ball 11 and which is stiffened longitudinally by a helical spring 12 which is housed within the arm. There are four of these arms but only one and its electrical connections will be described. Each arm is mounted on the end of a respective fender 13 of the automobile 14 and to project in a direction at a right angle to the direction of the movement of the automobile so as to strike one at a time against door casings and other obstructions in narrow passageways and being swung by such contact to indicate which fender is too close to the obstruction. The helical spring in the arm permits the arm to yield somewhat when an obstruction is struck so as not to become broken.

As best shown in Figures 2, 4, 5 and 6 the contact arm is provided at the inner end with a ball 15 which is provided at the top and bottom with trunnions 16. These trunnions are received in vertically disposed socket members 17 of a shell 18 having webs 19. The webs coact with the shell in forming a housing for a pair of aligned resistance coils 20 which are mounted on a bracket 21 carried by the inner face of the web. A circuit closing arm 22 is fixed to the ball 15. When the feeler arm 10 is swung to the position shown in Figure 1, by contact with an obstruction 23 the circuit closing arm 22 will be moved from neutral position onto one of the coils 20 and close a circuit through conductor wires 24, best shown in Figure 7, to a volt meter 25 located on the instrument board 26 of the automobile within easy view of the driver.

As the deviation of the feeler arm 10 becomes greater the circuit closing arm 22 is moved over the respective resistance coil to a greater extent thereby dropping the resistance of the circuit so that greater current will flow through the volt meter and indicate the deviation to the driver. The graduations on the volt meter are marked in inches so that as the pointer 26 of the volt meter moves over the graduations the driver may determine his clearance in inches.

At the end of each resistance coil a switch contact 27 is located and is connected by circuit wires 28 through a signal lamp 29, preferably colored red and located on the instrument board 26. Consequently when the deviation of the feeler arm 10 is greatest, denoting insufficient clearance, the red signal lamp will glow as a warning to the driver to cease attempting to continue his direction.

In order that the feeder arm may be swung to released position longitudinally of the vehicle, the shell 18 is provided with gudgeons 30 which are received in sockets 31 formed in a circular frame 32, best shown in Figure 6. The circular frame is secured to the fender through the medium of angle iron bracket arms 33 and remains stationary. The lower gudgeon 30 of the shell projects below the lower socket 31 of the frame and is equipped with a crank arm 34.

An operating lever 35 is pivoted intermediate its ends as shown at 36 to a bracket 37 which is attached to the rear face of the instrument board. A pair of flexible cables 38, best shown in Figures 1 and 3, are connected to a pin 39 carried by one end of the lever, and the front ends of these cables are connected to the crank arms of the two front contact arms 10. Likewise a pair of flexible cables 40 are connected to a pin 41 on the opposite end of the lever 35 and are connected to the crank arms of the two rear contact arms 10. When the operating lever is shifted from one limit of its movement to the other, the flexible cables will be manipulated to shift the feeder arms to project at a right angle to the vehicle or to extend longitudinally of the vehicle.

A pair of stops 42 are secured to the bracket 37 and a spring pressed pawl 43 is secured to the lever 35 to engage selectively with these stops and hold the bracket arms yieldable at either limit of swinging movement. A latch 44 is pivotally mounted on the lever as shown at 45 and controls the pawl 43.

By referring to Figure 5 it will be seen that the lower socket 17 of the shell is provided with a removable section 46 which permits of the gudgeons of the ball 15 being applied to the ball sockets 17. A helical spring 47 is seated in the upper socket and is sleeved on the upper gudgeon 16 of the ball. One end of the spring is secured to the wall of the socket and the other end of the spring is secured to the ball 15. The purpose of this spring is to return the contact arm to operative position after an obstruction has been passed.

In operation the driver shifts the lever 35 to dispose selected feeder arms 10 to project at a right angle to the side of the vehicle. When an arm strikes an obstruction it will be rocked rearwardly or forwardly according to the direction of motion of the vehicle and the circuit closing arms 22 thereof will ride onto the resistance coils 20 and close a circuit (A, B, C or D, see Figure 7) from the battery 35 through the respective volt meter 25. The resistance of either circuit will vary in accordance to the deviation of the contact arm which deviation may be read in inches on the volt meter. In the event the clearance is too little to permit passage of the vehicle the circuit closing arm 22 will ride onto either contact 27 and energize the red lamp so that the driver may stop motion in time to prevent injury to the automobile. When the contact arm is not needed the lever 35 is swung to dispose the arms in released position longitudinally of the automobile.

From the above description it is thought that the construction and operation of the invention will be fully understood without further explanation.

What is claimed is:

A clearance indicator for automobiles comprising a feeler arm, a support for said feeler arm, means for pivotally mounting said feeler arm on said support for movement in a horizontal plane, resilient means for normally retaining said feeler arm in a predetermined position with respect to said support but permitting said feeler arm to rotate in said horizontal plane when the feeler arm is in contact with an obstruction, means for pivotally mounting said support substantially at a corner of a vehicle for movement about a vertical axis, means operable from within the vehicle at the driver's position for rotating the support about said vertical axis to a position in which the feeler arm normally extends at right angles to the axis of said vehicle or to a position in which the feeler arm extends substantially parallel to the axis of the vehicle and for securing the support in either position, and means for indicating to the driver of the vehicle, the position of said feeler arm with respect to said support.

FRED CHANG.